US008890710B2

(12) United States Patent  
Rodney (10) Patent No.: US 8,890,710 B2  
(45) Date of Patent: Nov. 18, 2014

(54) METHOD AND SYSTEM OF AN ELECTROMAGNETIC TELEMETRY (75) Inventor: Paul F. Rodney, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 807 days.

(21) Appl. No.: 13/054,819

(22) PCT Filed: Jul. 31, 2008

(86) PCT No.: PCT/US2008/071748  
§ 371 (c)(1), (2), (4) Date: Jan. 19, 2011

(87) PCT Pub. No.: WO2010/014095  
PCT Pub. Date: Feb. 4, 2010

(65) Prior Publication Data  
US 2011/0187553 A1 Aug. 4, 2011

(51) Int. Cl.  
H04B 13/02 (2006.01)  
G01V 3/00 (2006.01)  
E21B 47/14 (2006.01)  
G01V 1/40 (2006.01)  
E21B 47/16 (2006.01)  
G01V 11/00 (2006.01)  
E21B 47/12 (2012.01)  
G01V 3/34 (2006.01)

(52) U.S. Cl.  
CPC ............ G01V 11/002 (2013.01); E21B 47/122 (2013.01); G01V 3/34 (2013.01)  
USPC ................... 340/852; 340/853.1; 340/854.3; 340/854.6; 367/81; 367/82

(58) Field of Classification Search  
CPC . E21B 33/0355; E21B 41/04; E21B 47/0001; E21B 47/12; E21B 47/122  
USPC ............. 340/853.1, 854.3, 854.4, 854.6, 852; 367/81, 82  
See application file for complete search history.

(56) References Cited

U.S. PATENT DOCUMENTS 3,793,632 A 2/1974 Still  
6,018,501 A 1/2000 Smith  
(Continued)

FOREIGN PATENT DOCUMENTS

EP 0945590 A2 2/1999  
EP 921269 A1 6/1999  
(Continued)

OTHER PUBLICATIONS

International Search Report and Written Opinion for PCT Patent Application No. PCT/US08/71748, filed Jul. 31, 2008.

(Continued)

Primary Examiner — Hai Phan  
Assistant Examiner — Franklin Balseca  
(74) Attorney, Agent, or Firm — Conley Rose, P.C.

(57) ABSTRACT

An electromagnetic telemetry repeater. At least some of the illustrative embodiments are methods comprising inducing an electrical signal along a metallic tubular (the electrical signal carrying the information and the inducing within a borehole beneath the ocean floor), sensing an electric field proximate to the ocean floor, sensing a magnetic field proximate to the ocean floor, recreating the information using one sensed field as indicative of the information and the other sensed field as indicative of the noise, and sending the information toward the ocean surface.

22 Claims, 8 Drawing Sheets

(56) References Cited

U.S. PATENT DOCUMENTS

| | | | |
|---|---|---|---|
| 6,144,316 | A | 11/2000 | Skinner |
| 6,150,954 | A | 11/2000 | Smith |
| 6,657,597 | B2 | 12/2003 | Rodney |
| 6,781,520 | B1 * | 8/2004 | Smith et al. ............... 340/853.1 |
| 6,781,521 | B1 | 8/2004 | Gardner |
| 7,163,065 | B2 | 1/2007 | Zhang |
| 7,170,423 | B2 * | 1/2007 | Wisler et al. ............... 340/853.7 |
| 7,243,028 | B2 | 7/2007 | Young |
| 7,268,696 | B2 * | 9/2007 | Rodney et al. ............ 340/854.6 |
| 7,389,183 | B2 | 6/2008 | Gray |
| 7,477,160 | B2 * | 1/2009 | Lemenager et al. ....... 340/853.1 |
| 8,305,229 | B1 * | 11/2012 | Gard ......................... 340/854.6 |
| 2006/0106587 | A1 | 5/2006 | Rodney |
| 2009/0265111 | A1 * | 10/2009 | Helwig et al. .................... 702/7 |

FOREIGN PATENT DOCUMENTS

| | | |
|---|---|---|
| EP | 0922836 A1 | 6/1999 |
| EP | 0932054 A2 | 7/1999 |
| EP | 1748151 A1 | 1/2007 |
| GB | 2377131 A | 12/2002 |

OTHER PUBLICATIONS

Thomas S. Wiener entitled The Role of Blue/Green Laser Systems in Strategic Submarine Communications; IEEE Transaction on Communications, vol. COM-28, No. 9, Sep. 1980.

European Search Report, Application No. 08796951.5-1559/2329300, Dated Oct. 14, 2013.

* cited by examiner

METHOD AND SYSTEM OF AN ELECTROMAGNETIC TELEMETRY

CROSS-REFERENCE TO RELATED APPLICATIONS

This application claims the benefit of PCT application serial number PCT/US2008/071748, filed Jul. 31, 2008, titled "Method and System of an Electromagnetic Telemetery Repeater", and which application is incorporated by reference as if reproduced in full below.

BACKGROUND

Modern petroleum drilling and production operations demand a great quantity of information relating to parameters and conditions downhole. Such information may comprise characteristics of the earth formations traversed by the borehole, along with data relating to the size and configuration of the borehole itself. Collecting and processing data during the drilling process allows the driller to make modifications or corrections to increase performance while reducing down time of the drilling process. Methods of measuring conditions downhole, including the movement and location of the drilling assembly contemporaneously with the drilling, have come to be known as "measurement-while-drilling" techniques, or "MWD." Similar techniques, concentrating more on the measurement of formation parameters, have been referred to as "logging-while-drilling" techniques, or "LWD." While distinctions between MWD and LWD may exist, the terms MWD and LWD are often used interchangeably. For purposes of this disclosure, the term MWD will be used with the understanding that this term encompasses both the collection of formation parameters and the collection of information relating to the movement and position of the drilling assembly.

In MWD operations, sensors and/or transducers on the drilling assembly continuously or intermittently monitor drilling parameters and formation data, and transmit the information to the surface as telemetry. A widely used telemetry system in MWD applications uses pressure pulses impressed on the drilling fluid (sometimes referred to as mud) within the drill string, and thus is known as mud pulse telemetry. In particular, mud pulse telemetry systems communicate by way of pressure pulses in a drilling fluid circulated under pressure through the drill string during drilling operations. The pressure pulses propagate from near the drill bit to the surface, where the pressure pulses are detected, and the data encoded therein extracted. Depending on the type of drilling fluid used, the velocity of the pressure pulses may vary between approximately 3000 and 5000 feet per second. The rate of transmission of data, however, is relatively slow due to pulse spreading, distortion, attenuation, modulation rate limitations, and other disruptive forces, such as ambient noise in the drill string. In most applications of mud pulse telemetry, the data rate at which information is sent from downhole to the surface (or vice versa) is about one Boolean value per second.

With recent developments in sensing and steering technologies available to the driller, the amount of data that can be conveyed to the surface in a timely manner using mud pulse telemetry is inadequate. Thus, systems and methods are needed to increase the data rate for telemetry between downhole and the surface, particularly in offshore applications.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, energy companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"Proximate" in reference to the ocean floor shall mean within a few feet of the ocean floor. Thus, whether a device is sitting on the ocean floor, buried a few feet below the ocean floor, or floating a few feet above the ocean floor, the device is still proximate to the ocean floor.

"Tubular" shall mean not only drill pipe, but also casing within a borehole, and where applicable tubulars that extend from the wellhead of an underwater borehole toward the surface of the water.

"Signal" shall mean either an electrical signal (e.g., carried along a conductor) containing information and/or noise, or a digital signal (e.g., within a computer) containing information and/or noise, unless the contexts limits to a particular form.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
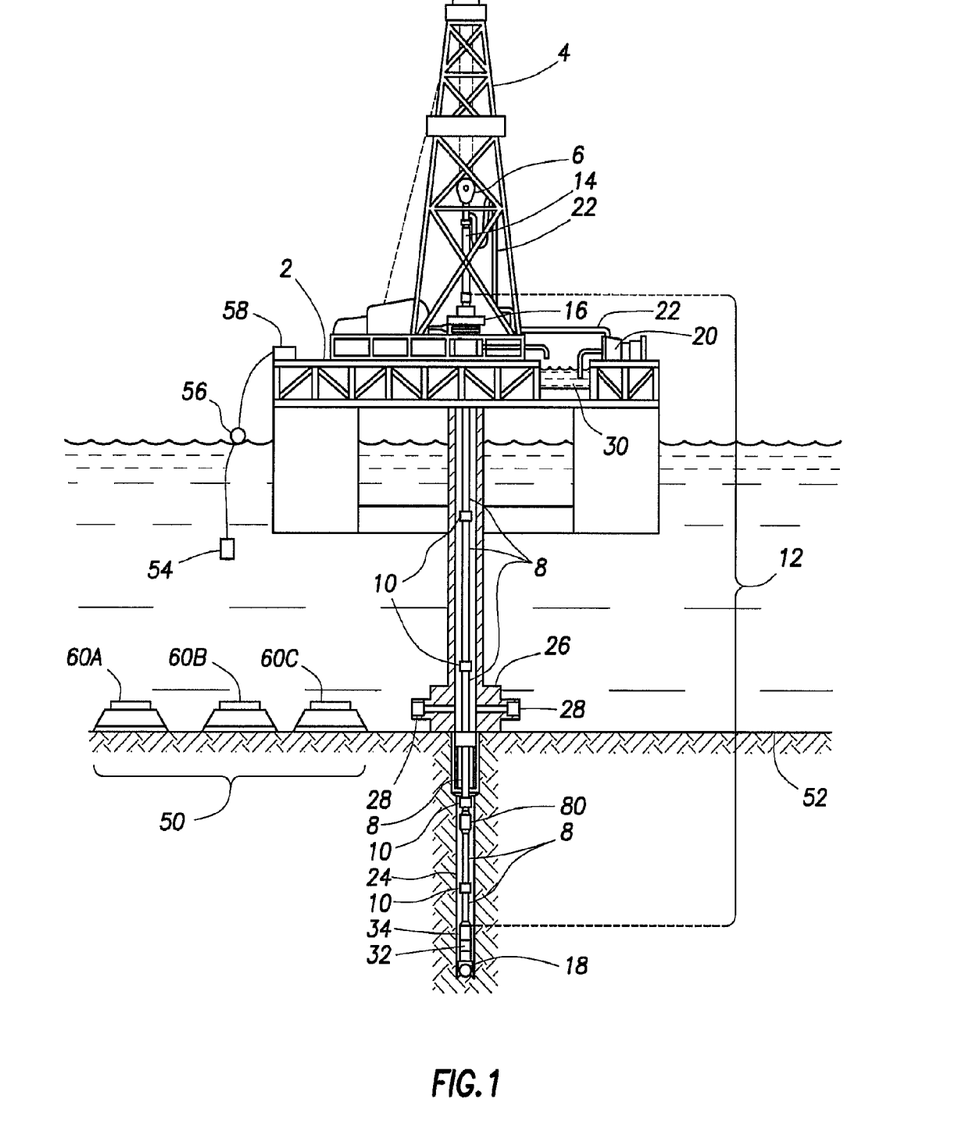
FIG. 1 shows a system in accordance with various embodiments.

FIG. 1 shows an offshore drilling platform during drilling operations in accordance with at least some embodiments. In particular, a drilling platform 2 is equipped with a derrick 4 that supports a hoist 6. Drilling of oil and gas wells is carried out by a string of drill pipes 8 connected together by tool joints 10 so as to form a drill string 12. The hoist 6 suspends a kelly 14 that is used to supply drilling fluid to the drill string 12 during drilling operations. A rotary table 16 or a top drive motor may be used to rotate the drill string 12, thereby rotating a drill bit 18 connected to the lower end of the drill string. In alternative embodiments, the drill string 12 may be held rotationally fixed, and a downhole mud motor, turned by the drilling fluid, causes rotation of the drill bit 18.

In either case, drilling fluid is pumped by recirculation equipment 20 through supply pipe 22, through drilling kelly 14, and down through the drill string 12 at high pressures and volumes. The drilling fluid emerges through nozzles or jets in the drill bit 18, and then travels up the borehole by way of the annulus between the drill string 12 and the borehole wall 24. The drilling fluid then travels through wellhead 26 (which includes blowout preventers 28), the riser piping that connects the wellhead 26 to the platform, and into a mud pit 30 on the platform 2. On the surface, the drilling fluid is cleaned and then recirculated by recirculation equipment 20. The drilling fluid serves to cool the drill bit 18, to carry cuttings from the bottom of the borehole to the surface, and to balance the hydrostatic pressure in the rock formations.

Sensors within downhole tool 32 couple to downhole transmitter 34, which transmits telemetry (i.e., information-carrying signals) along drill string 12. The telemetry in accordance with the various embodiments is in the form of an electrical signal induced on tubulars of the drill string 12. The electrical signal produces not only a voltage on the metallic tubing (which creates an electric field around the tubing), but the electrical signal also induces a current flow through the metallic tubing (which likewise produces a magnetic field around the tubing). Thus, the telemetry may be equivalently referred to electromagnetic telemetry.

Telemetry transmissions from downhole transmitter 36 may include data sent as it is collected ("continuous" or "real-time" data), data stored and transmitted after a delay ("buffered" or "historical" data), or a combination of both. Logging-while-drilling (LWD) data collected during actual drilling may be collected at a relatively high resolution and saved locally in memory (e.g., within downhole tool 32 or downhole transmitter 36). But because of the limited bandwidth of downhole telemetry systems, real-time data may have to be transmitted at a lower resolution. In at least some embodiments, the data may be saved at a higher resolution as described above, and transmitted to the surface at a later time when the tool is still downhole, but while drilling is not taking place (e.g., when a tool gets stuck or when the hole is being conditioned). The historical data transmission may be at a resolution higher than the resolution normally used for real-time data transmission.

Electrical conditions above and below the wellhead 26 vary significantly. Below the wellhead 26, the well casing is surrounded by cement and/or earth formations that generally have higher resistively than sea water. For this reason, electromagnetic signals propagating along the tubing within the borehole (e.g., the drill string 12 and/or the casing within the borehole) typically suffer less dissipation below the wellhead 26 than above the wellhead 26. Because of the rapid attenuation of the electromagnetic signals above the wellhead 26, in accordance with the various embodiments a telemetry repeater system 50 is placed proximate to the ocean floor 52 and in operational relationship to the wellhead 26.

In accordance with the various embodiments, the telemetry repeater system 50 senses fields (i.e., electric fields and magnetic fields) associated with the electromagnetic signals propagating along the tubulars of the drilling process. The telemetry repeater system 50 recreates the information contained in the electrical signal as induced by the telemetry transmitter 34 (e.g., demodulates the signal) to obtain the uplink data. The telemetry repeater system 50 then sends the uplink data toward the surface for detection by surface, or near-surface, equipment. In particular, in accordance with the various embodiments the telemetry repeater system 50 may send the uplink data in the form of acoustic signals propagated through the ocean water, optical signals propagated through the ocean water, or the telemetry repeater may couple to cables that run between the wellhead and equipment on the drilling platform 2. In the case of acoustic of optical transmission through the ocean water, the modulated uplink data forwarded by the telemetry repeater system 50 is received by a sensor 54, which may be suspended from the surface of the water by a retrievable cable and buoy 56. Because the cable and buoy are retrievable, they can be easily recovered or repositioned to avoid creating a navigational hazard. Further, multiple sensor 54 may be deployed along the length of the cable to enable array processing, which may increase sensitivity to the uplink signals and decrease sensitivity to electrical and/or acoustic noise emanating from the drilling platform. The signals received by the sensor 54 may be sent to platform electronics 58, which platform electronics 58 may be configured to demodulate the signals and recover the uplink data.

Still referring to FIG. 1, the telemetry repeater system 50 in accordance with at least some embodiments comprises a plurality of sensor assemblies 60. Each sensor assembly 60 comprises an electric field detection subsystem and a magnetic field detection subsystem (i.e., a magnetometer). The electric field detection subsystem in accordance with the various embodiments comprises horizontal electric field detection based on a wire or conductor electrically coupled on one end to a respective sensor assembly 60 and the conductor extends proximate to the ocean floor toward the wellhead 26. The electrical conductor for each electric field detection subsystem may be buried beneath the ocean floor, lay along the ocean floor, or possibly even configured to float a few feet above the ocean floor, depending on the particular ocean floor layout near the wellhead 26. In some embodiments, the sensor assemblies also comprise vertical electric field detection; however, for reasons that will become clear after the discussion below, the sensor assemblies at greater distances from wellhead 26 may omit the vertical electric field detection equipment. Likewise, the sensor assemblies closer to the wellhead may omit the horizontal electric field detection equipment.

The physical placement of the sensor assembly 60 themselves may likewise vary depending on the particular situation. In some cases the closest sensor assembly 60 may be placed physically in contact with the wellhead 26. The most distant sensor assembly 60 may be a considerable distance from the wellhead 26, for example on the order of 500 meters or more. In most situations, however, the closest sensor assembly 60 may be placed within three meters or less from the wellhead 26, the most distant sensor assembly 60 may be placed on the order of 30 meters from the wellhead 26, and one or more additional sensor assemblies 60 may be placed between the closest and farthest sensor assemblies. It follows from the placement of the sensor assemblies that the conductor for the horizontal electric detection for each sensor assembly 60 may be of differing lengths.

The inventor of the present specification has found that the horizontal electric fields sensed by the sensor assemblies 60 are more closely correlated with the electrical signal induced on the tubing by the transmitter 34 with increasing distance from the wellhead 26. Stated otherwise, while any sensed electric field may comprise portions corresponding to the electrical signal and portions corresponding to noise, as the distance from the wellhead 26 increases (and the length of the conductor associated with the horizontal electric field detection increases), the signal component of sensed electric fields likewise increases. The opposite is also true; namely, as the distance from the wellhead 26 decreases (and the length of conductor decreases), the signal component of sensed electric fields decreases. Moreover, the vertical component of sensed electric fields is not closely correlated with the signal induced on the tubing by transmitter 34, but the vertical component is more closely correlated with the noise with decreased distance from the wellhead 26.

Correspondingly, the inventor of the present specification has also found that the magnetic fields sensed by the sensor assemblies 60 are more closely correlated with the electrical signal induced on the tubing by the transmitter 34 with decreasing distance from the wellhead 26. Stated otherwise, while any sensed magnetic field may comprise portions corresponding to the electrical signal and portions corresponding to the noise, as the distance from the wellhead 26 decreases, the signal component of the sensed magnetic fields increases. Likewise, as the distance from the wellhead 26 increases, the signal component of the sensed magnetic field likewise decreases.

In accordance with the various embodiments, the telemetry repeater system 50 utilizes the relationship between sensed electric field and distance from the wellhead 26, as well as the relationship between sensed magnetic field and distance from the wellhead 26, to enhance recovery of the uplink data at the ocean floor for purposes of repeating or resending the data toward the ocean surface. Consider, as an example, a telemetry repeater system 50 comprising a single sensor assembly 60 proximate (e.g., within three meters or closer) of the wellhead 26. As discussed above, the electric field detection subsystem of the sensor assembly 60 detects electric fields proximate to wellhead 26. Because of the proximity of the sensor assembly 60 to the wellhead 26 in this illustrative example, while the electric field detected will have some components proportional to the electrical signal induced on the tubulars by the transmitter 34 (i.e., the telemetry), the electric field (whether horizontal or vertical) will be predominately proportional to noise associated with the drilling system (e.g., 60 hertz noise, noise associated with operation of electrical components on the drilling rig). However, the magnetometer of the sensor assembly 60 senses the magnetic fields proximate to the wellhead 26, and the magnetic fields, while having components proportional to both the telemetry and the noise, the magnetic fields will be predominately proportional to the telemetry. In accordance with these embodiments, a signal created proportional to the detected electric field is used for purposes of noise cancellation with respect to a signal created proportional to the detected magnetic fields. In particular, portions of the signal associated with the detected magnetic fields are removed proportional to detected electric field, thus removing a significant portion of the noise. The signal associated with the magnetic field may then be demodulated to recover or recreate the uplink data, which uplink data may then be sent toward the surface through other mechanisms, such as being modulated on an acoustic signal or modulated in an optical signal directed to the ocean surface.

Figure 2A:
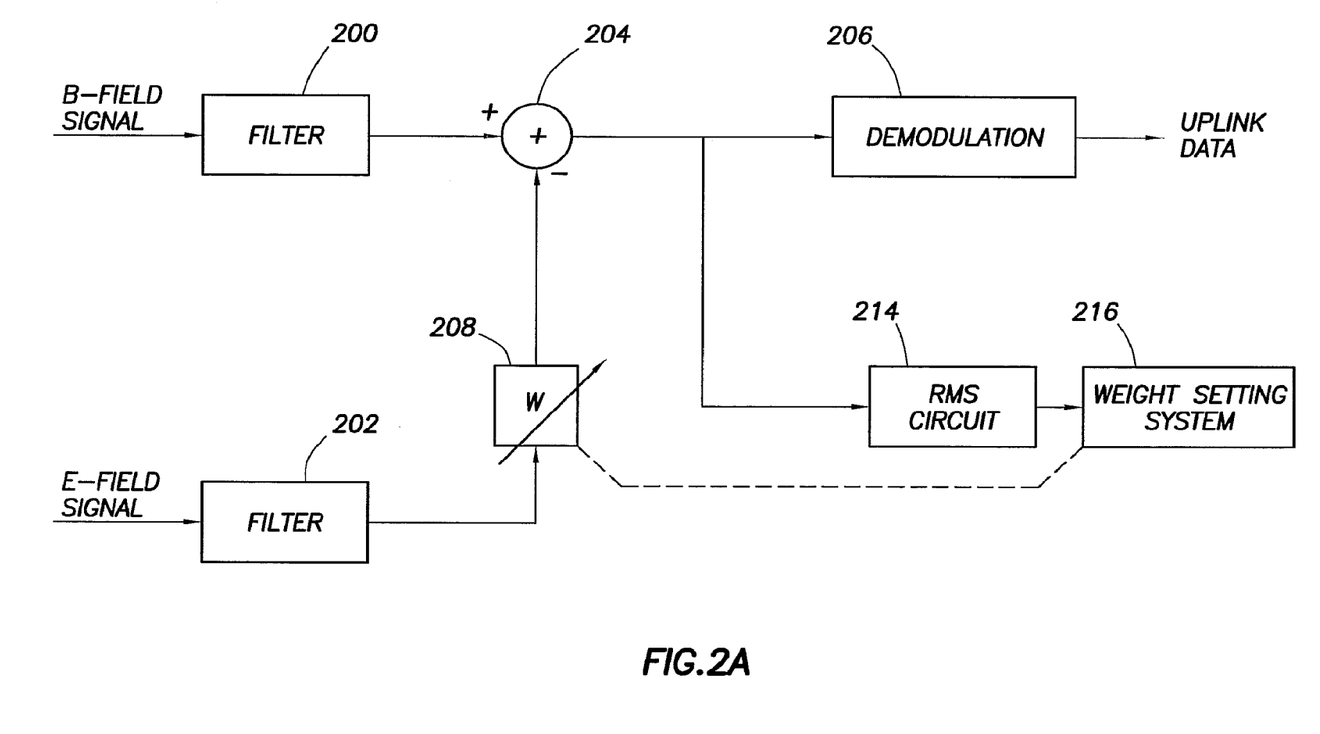
FIG. 2A shows a system to reduce noise in detected telemetry signals in accordance with various embodiments.

FIG. 2A illustrates graphically combining the signals associated with the electric field and magnetic field to obtain the uplink data in accordance with embodiments using a single sensor assembly 60. In particular, both the signal associated with magnetic field (B-field) and the signal associated with the electric field (E-field) may be subjected to filtering, as indicated by filters 200 and 202. For example, if the telemetry is limited to a particular band of frequencies, filters 200 and 202 may be band-pass filters that allow only frequencies with the expected range to pass. In accordance with at least some embodiments, the signal associated with the magnetic field and signal associated with electric field are summed, for example at summation block 204. As indicated, the signal associated with the electric field is subtracted, such that the output of the summation at block 204 results, in the theoretical sense, in a pure telemetry signal. The telemetry signal may then be applied to demodulation as illustrated by block 206, which reveals the uplink data.

In more sophisticated systems, the combining of the signal associated with the magnetic field and the signal associated with the electric field may use a form of adaptive filtering to ensure a proper reduction of the noise components before the demodulation. For example, the weighting of the signal associated with the electric field may be adjusted, as illustrated by the weighting block 208. The amount of weighting applied by the weighting block 208 may be controlled by root mean square (RMS) value of the signal resultant of the summation block 204. In particular, the RMS circuit 214 determines the RMS value of the resultant signal. The RMS value of the resultant signal is then applied to a weight setting system 216. The weight setting system 216 adjusts the weight of illustrative weighting block 208 to reduce the RMS value of the resultant signal. When the noise component is properly removed, the RMS value of the resultant signal is just that of the telemetry signal. Stated otherwise, the resultant signal reaches a "minimum" RMS value when the noise is properly removed. The "minimum" value in this case not a zero value, but instead the RMS value of the telemetry signal.

In some embodiments, the filtering, creation of the telemetry and error signals, adaptive filtering, and demodulation take place with the various signals and operations in analog format. However, in other embodiments the operations take place digitally, with the signals associated with the sensed electric and magnetic fields converted to a stream of digitally sampled values, and the various filters, summations, adaptive filtering and demodulation taking place by way of software executed on a processor (e.g., a digital signal processor).

In accordance with at least some embodiments, the adaptive filtering to achieve weight values takes place by way of a binary search technique. In particular, in embodiments where the various signals are manipulated digitally, the signals associated with the sensed fields are periodically sampled. For each set of samples for each field value, the binary search technique implemented by the weight setting system 216 performs a series of calculations to determine a weighting value suitable for the particular set of samples. For the immediately subsequent set of samples, the weight setting system 216 may start anew to determine the weighting value suitable, or may leverage the determination based on the result for the previous samples. Thus, the clock frequency of the processor which implements the binary search technique is faster than the sample clock frequency such that a complete set of iterative determinations may be made between each set of samples.

Figure 2B:
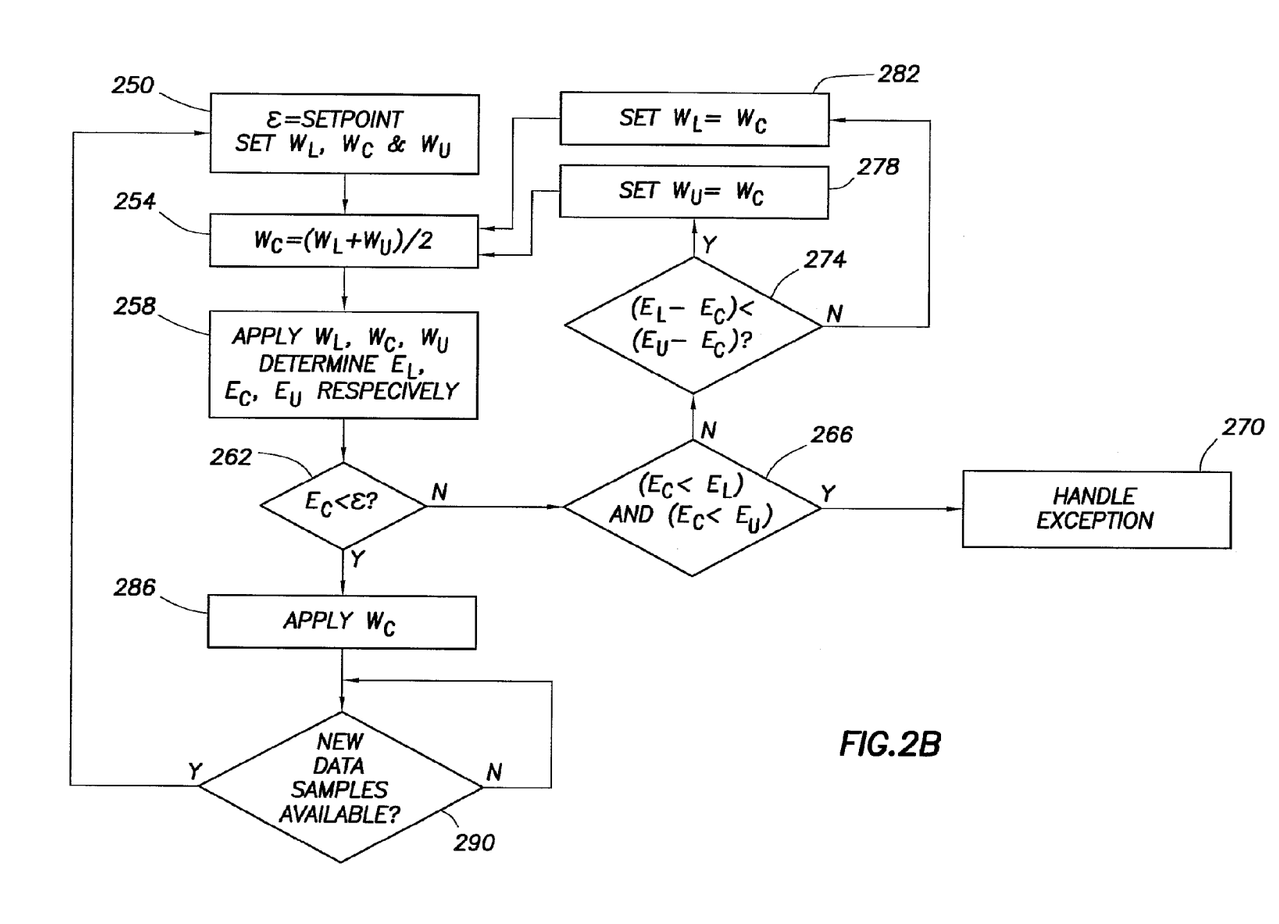
FIG. 2B shows a flow diagram of operation of a weight setting system in accordance with at least some embodiments.

FIG. 2B shows an illustrative flow diagram regarding the binary search technique in accordance with these illustrative embodiments. In particular, the flow diagram represents actions taken with respect to a set of contemporaneous samples of the values of the sensed fields. The steps illustrated by FIG. 2B are repeated for each set of subsequent contemporaneous samples of the field values. Initially, the target rms value ($\epsilon$) is selected, the maximum or upper allowable weighting is selected ($W_U$), and the minimum or lower allowable weighting is selected ($W_L$) (block 250). In cases where the binary search technique operates anew on each set of contemporaneous samples, $W_U$ and $W_L$ are set to the largest possible values. In other embodiments, $W_U$ and $W_L$ may be set based on the ultimate weighting values from a previous iteration.

Regardless of whether the range of possible weighting values in the binary search technique start anew each iteration or are based, at least in part, on the previous iterations, a center weighting value ($W_C$) is calculated (block 254). Next, the weighting values $W_U$, $W_L$ and $W_C$ are each applied to the weighting block 208, and for each weight an RMS value $E_U$, $E_L$ and $E_C$ are read for applied $W_U$, $W_L$ and $W_C$ values respectively (block 258). In most cases the initial application of the weightings represented by block 258 results in the RMS for the center weighting value $E_C$ being greater than $\epsilon$ (block 262). Thus, the presence of an exception condition (i.e., the error for the center value being less than both the upper and lower values) is tested (block 266), and if present the exception condition is handled (block 270) (e.g., selecting a different ranges for weights). Next a determination is made as to whether a difference between the RMS value for the lower and center weight values is less than the RMS error for the upper and center weight values (block 274). If so, the upper weight value is set equal to the center weight values (block 282), and the next iteration resumes at block 254. If, on the other hand, the difference between the RMS value for the lower and center weight values is greater than the RMS value for the upper and center weight values (again block 274), then lower weight value is set equal to the center weight values (block 278), and the next iteration resumes at block 254.

Thus, the binary search technique continues for one or more iterations until the value for the center value $E_C$ is less than the setpoint RMS value $\epsilon$ (again block 262). When the condition tested by block 262 is met, the binary search technique applies the determined center value $W_C$ (block 286), and then checks to determine when the next set of contemporaneous samples are available (block 290). If not, the system waits for the next set of samples. The combining of the signal associated with the magnetic field and the signal associated with the electric field in FIG. 2 is merely illustrative. Other adaptive filter arrangements may be used to ensure that a proper proportion of the noise represented by the signal associated with the electric field is removed from the signal associated with the magnetic field in this illustrative situation.

While having a telemetry repeater system 50 that comprises a single sensor assembly 60, and takes advantage of the relationship between the electric fields and magnetic fields in relation to the distance from the wellhead 26, may be operational, in accordance with other embodiments the detection of the telemetry signals and the noise is enhanced through use of the plurality of sensor assemblies 60 in the telemetry repeater system 50. Using a plurality of sensor assemblies 60 enables array processing techniques for noise reduction and uplink data recovery prior to sending the uplink data toward the surface.

Figure 3:
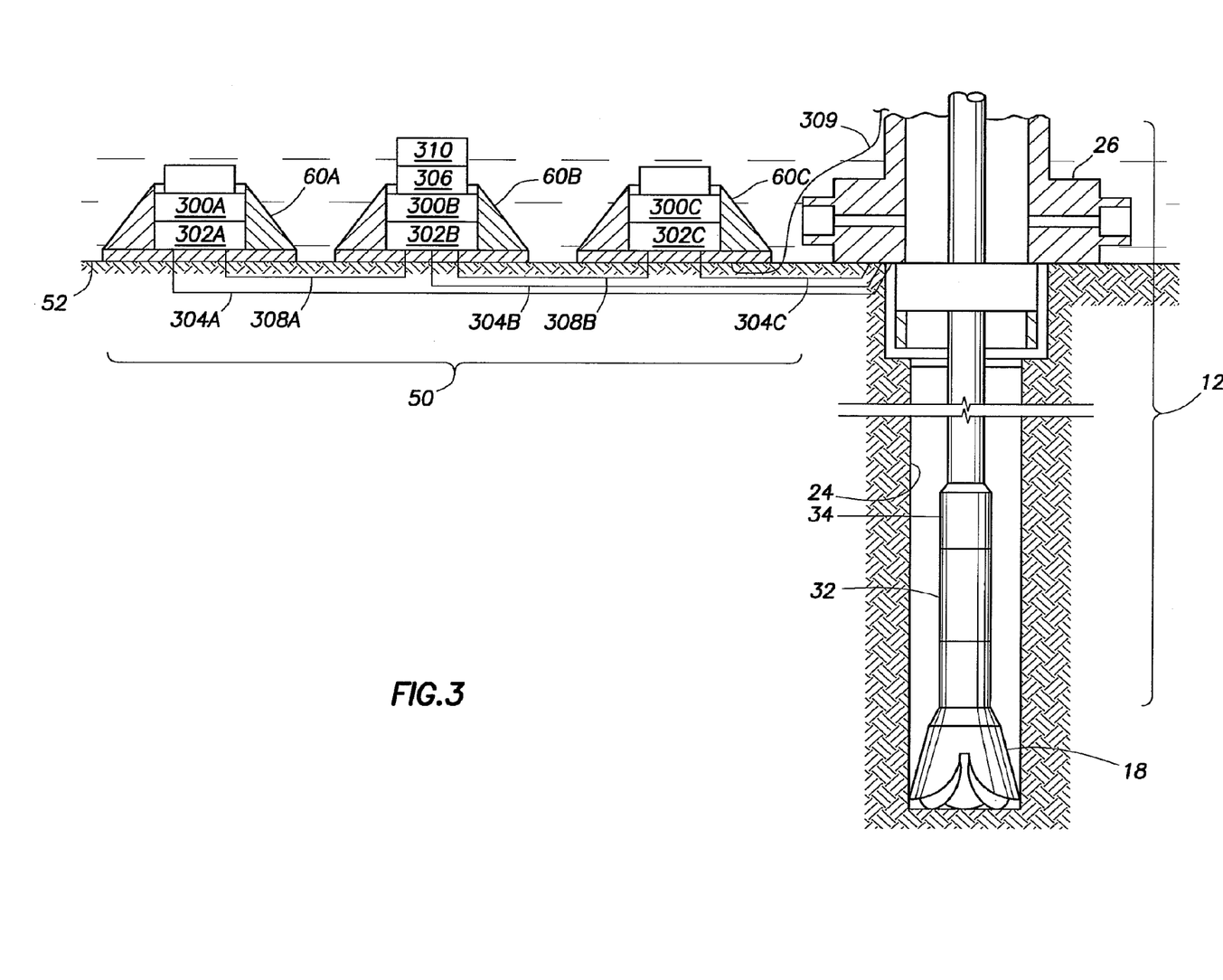
FIG. 3 shows a telemetry repeater system in accordance with various embodiments.

FIG. 3 illustrates a portion of the underwater system of FIG. 1. In particular, FIG. 3 illustrates the borehole 24 and a portion of the drill string 12 within the borehole 24. At the lower end of the drill string 12 is the drill bit 18, along with the downhole tool 32 and telemetry transmitter 34. On the ocean floor 52 resides the telemetry repeater system 50 comprising three illustrative sensor assemblies 60A-C. In accordance with the various embodiments, each sensor subassembly 60 has a magnetometer 300 configured to sense magnetic fields associated with electrical currents flowing in the tubulars within the borehole 24. In some embodiments, the magnetometers 300 are scaler magnetometers, meaning that the magnetic fields detected are only detected in a field strength sense. In yet other embodiments, the magnetometers 300 may be two- or three-axis magnetometers such that not only the field strength, but also the field direction, may be determined. Each sensor assembly 60 also comprises an electric field sensor 302 configured to sense an electric field associated with the electrical current flow in the tubulars within the borehole 24. As mentioned above, for horizontal components of electric field the electric field sensor 302 is associated with an electrical conductor 304 that extends from the respective sensor assembly 60 towards the wellhead 26. In the illustrative case of FIG. 3, the electrical conductors 304 are shown to extend from their respective sensor assembly 60 and be in electrical contact with the wellhead 26. However, in alternative embodiments the electrical conductors may extend toward but not electrically contact the wellhead 26. Moreover, FIG. 3 shows the electrical conductors 304 buried beneath the ocean floor. However, in alternative embodiments the electrical conductors 304 may lie along the ocean floor, or may be configured to float proximate to the ocean floor (e.g., using buoys).

In accordance with the embodiments using multiple sensor assemblies 60 in the telemetry transmitter system 50, array processing techniques are used to recover the telemetry signal. Using array processing techniques to recreate the telemetry signal is discussed more fully below. While each sensor assembly 60 may have onboard electronics and perform some signal processing with respect to the signals associated with the electric field and signal associated with the magnetic field, recreating the telemetry signal dictates that signals from all of the sensor assemblies 60 be provided to a signal processing system. In accordance with at least some embodiments, one of the sensor assemblies 60 comprises a signal processing system 306. Although the signal processing system 306 is shown in the center sensor assembly 60B, the signal processing system 306 may be placed within any sensor assembly 60, or may be a stand alone component proximate to the sensor assemblies 60. In order to communicate the signals associated with sensed electric and magnetic fields, in accordance with at least some embodiments communication cables extend between each of the sensor assemblies 60, as illustrated by communication cables 308. Thus, analog, or digital, representations of the signals associated with detected electric and magnetic fields may be transmitted along the communication cables 308 to the sensor assembly 60 housing the signal processing system 306. In alternative embodiments, representations of the signals associated with the detected electric and magnetic fields may be communicated between the sensor assemblies 60 by any suitable communication means, such as acoustic or optical-based communication, similar to that used to communicate the uplink data toward the ocean surface. Inasmuch as the data processing to recover the uplink data is performed by the signal processing system 306, the sensor assembly 60 that comprises the signal processing system 306 may likewise comprise a communication subsystem 310 configured to send to the uplink data toward the surface as discussed above. Here again, while the communication cables 308 are shown to reside below the ocean floor 52, in alternative embodiments the communication cables 308 may lay along the ocean floor, or may float proximate to the ocean floor as the particular situation dictates. FIG. 3 further shows that in some embodiments, the uplink data may be sent toward the surface by way of a cable 309 extending along the wellhead 28 and risers.

In the embodiments using a single sensor assembly 60, the signal associated with the magnetic field was itself the signal predominately correlated to the telemetry signal, and the signal associated with the electric field was itself the signal predominately associated with the noise. However, in accordance with embodiments using a plurality of sensor assemblies 60, all the signals associated with the electric field, and all the signals detected magnetic fields, may be combined to create a primary or telemetry signal predominately correlated to the telemetry sent from the transmitter 34. Likewise, all the signals associated with detection of electric fields, and all the signals associated with detection of magnetic fields, may be combined to create a secondary or noise signal that is predominately correlated to the noise.

Combining the various signals associated with the sensed fields to create the telemetry and noise signals is based on the distance of the detection from the wellhead 26. As for electric fields, the weight that each signal associated with a sensed electric field is given in the overall telemetry signal is directly proportional to the distance at which the electric field signal is sensed. The weight attributed to each signal associated with sensed magnetic fields in creating the telemetry signal is indirectly or inversely proportional to the distance at which the magnetic field is sensed. As for the noise signal predominately correlated to the noise, the weighting is reversed. That is, the weight sensed electric fields are given in the noise signal is inversely proportional to the distance at which the electric field is sensed. And, the weight attributed to sensed magnetic fields is directly proportional to the distance at which the magnetic field is sensed.

Figure 4:
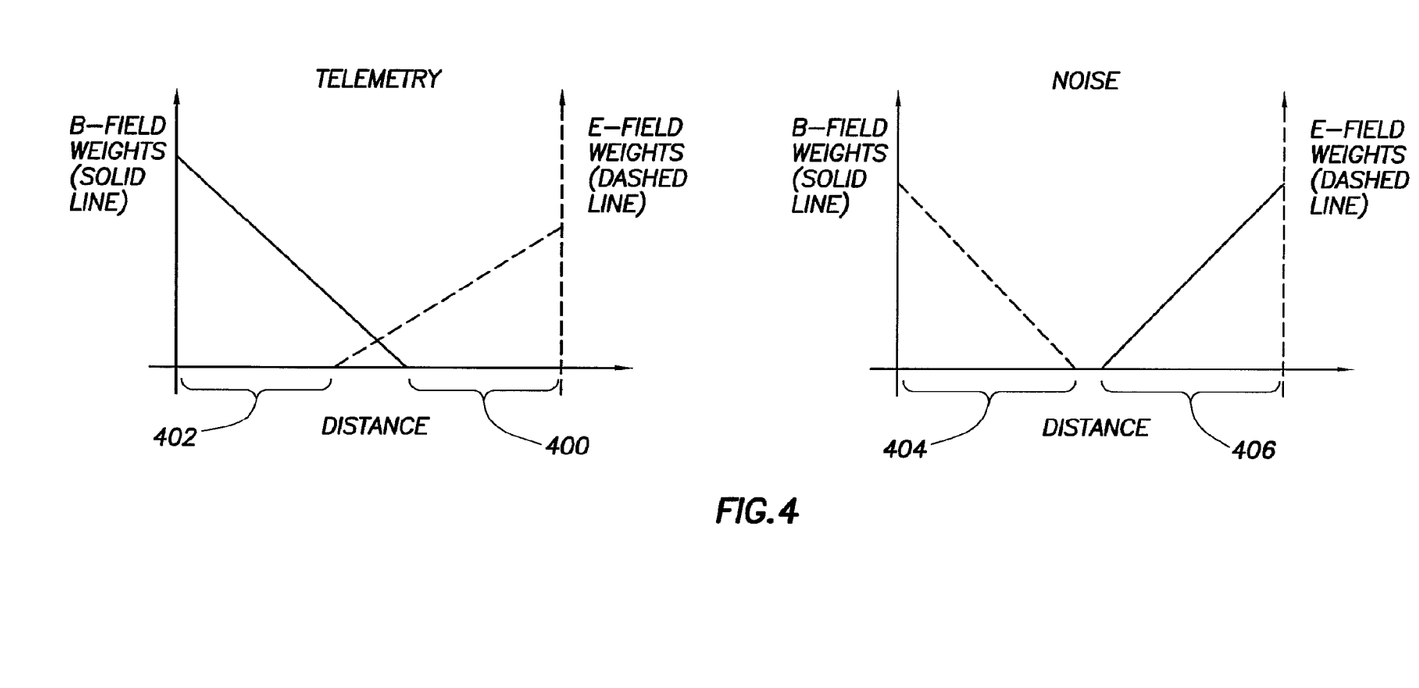
FIG. 4 shows graphs of illustrative contributions of signals associated with sensed fields to the telemetry and noise signals.

FIG. 4 graphically illustrates the weightings applied to the various sensed fields to create the telemetry signal and the noise signal in accordance with at least some embodiments. With respect to the telemetry signal, the magnetic field weights for the sensor assemblies 60 close to the wellhead 26 are given higher weights than those of greater distances. As illustrated on the telemetry graph, in some embodiments the magnetic field associated with the more distant sensor assembly 60 is selected to provide little or no contribution to the telemetry signal, as illustrated by portion 400. Likewise, the weights that sensed electric fields are given in the telemetry signal are proportional to the distance of the sensor assembly 60 from the wellhead 26. Here again, in some situations the signals associated with electric fields close to the wellhead are selected to provide little or no contribution to the telemetry signal, as illustrated by area 402.

Still referring to FIG. 4, and in particular the noise graph, the signals associated with magnetic fields sensed close to the wellhead 26 are given less weight than the signals associated with magnetic fields sensed at greater distances. In some embodiments, the signals associated with magnetic fields closest to the wellhead 26 are selected to provide little or no contribution to the noise signal, as illustrated by area 404. Likewise, the weights attributed to signals associated with electric fields closest to the wellhead 26 are greater than the weights assigned to signals associated with electric fields at greater distances from the wellhead. Much like before, in some embodiments the signals associated with electric fields at the greater distances are selected to provide little or no contribution to recreation of the noise signal, as illustrated by area 406.

Figure 5:
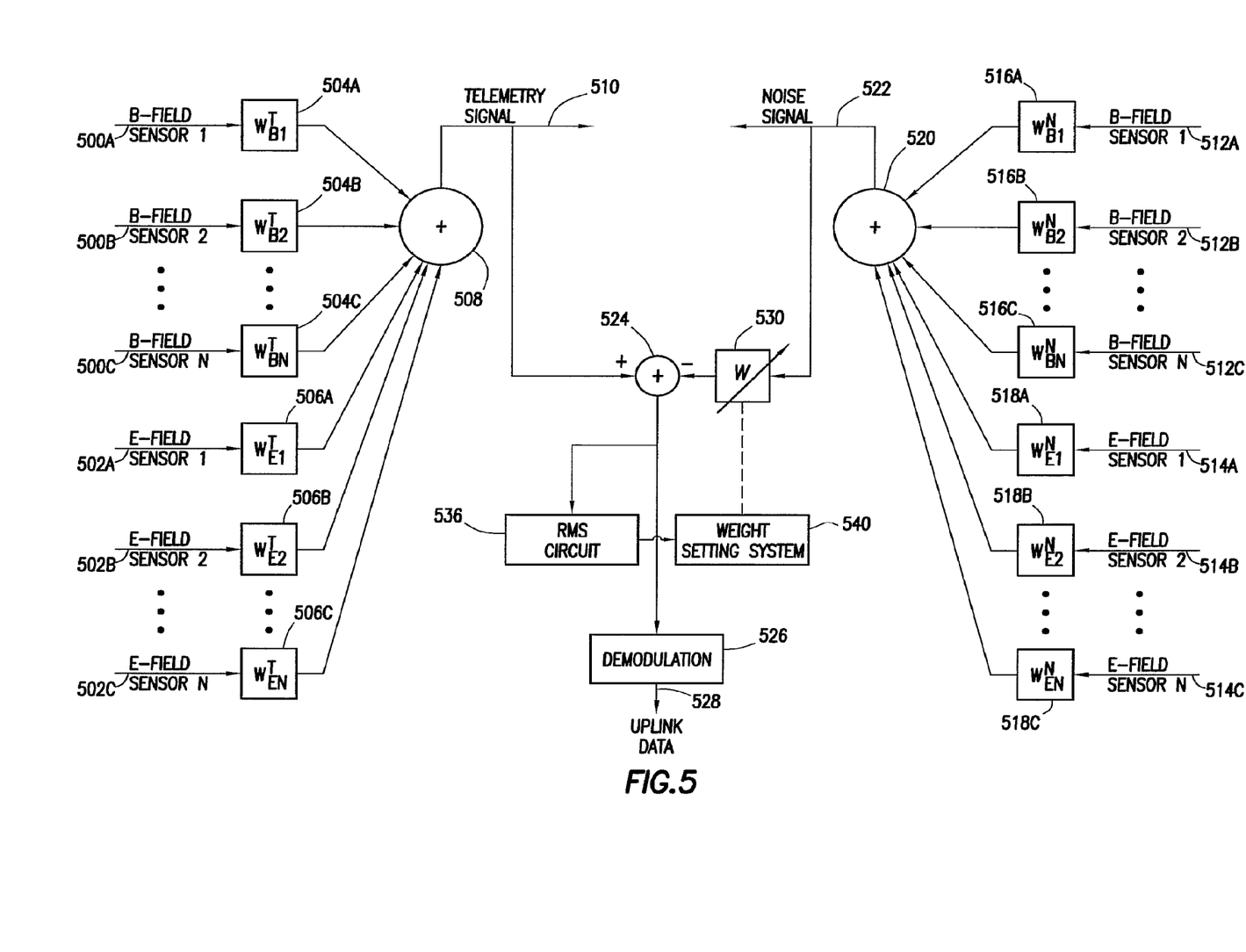
FIG. 5 shows a system to reduce noise in detected telemetry signals in accordance with various embodiments.

FIG. 5 graphically illustrates creating the telemetry and noise signals in accordance with embodiments using multiple sensor assemblies 60. With respect to the telemetry signal on the left side of the figure, each of the signals associated with the sensed magnetic fields (the signals illustrated by lines 500A-C) along with the signals associated with the sensed electric fields (the signal illustrated by lines 502A-C) are each applied to their respective weighting blocks, 504A-C for the magnetic field sensors, and 506A-C for the electric field sensors. The weighting applied by the weighting blocks 504 and 506 may be selected as illustrated in the graphs of FIG. 4. Regardless of the precise weighting, each of the signals is applied to a summation block 508 which sums the various weighted signals to create the telemetry signal 510. While all of the signals associated with the sensed magnetic fields and sensed electric fields are shown to have the ability contribute the telemetry signal 510, in some embodiments some of the weighting in weighting blocks 504 and/or 506 may be zero, such that the particular signal provides no contribution to the telemetry signal 510. The various signals may be filtered (e.g., band-pass filtered to be within an expected frequency range) as shown in FIG. 2, but such filtering is omitted from FIG. 5 so as not to unduly complicate the figure.

Still referring to FIG. 5, and in particular the right hand side of the figure associated with the noise signal. Each of the signals associated with the sensed magnetic fields 512A-C, and each of the signals associated with the sensed electric fields 514A-C, are applied to respective weighting blocks 516A-C (for the signals associated with the sensed magnetic fields) and 518A-C (for the signals associated with the sensed electric fields). As before, the weighting blocks 516 and 518 provide selectable weighting for the signals associated with the sensed fields, and the amount of weighting may be selected as illustrated in FIG. 4. Regardless of the precise weighting, each of the signals is applied to a summation block 520 which sums the various weighted signals to create the noise signal 522. While all of the signals associated with the sensed magnetic fields and sensed electric fields are shown to have the ability contribute the noise signal 522, in some embodiments some of the weighting in weighting blocks 516 and/or 518 may be zero, such that the particular signal provides no contribution to the noise signal 522. The various signals may be filtered (e.g., band-pass filtered to be within an expected frequency range) as shown in FIG. 2, but such filtering is omitted from FIG. 5 so as not to unduly complicate the figure.

As before, the telemetry signal 510, while being predominately correlated to the telemetry created by the transmitter 34, still comprises noise. In order to remove or reduce the noise, the telemetry signal 510 and the noise signal 522 are applied to a summation block 524, where the noise signal 522 is subtracted from the telemetry signal 510. The output of the summation block 524 is the telemetry signal with at least some of the noise removed. The telemetry signal is then applied to the demodulation block 526, which demodulates the telemetry signal to recover the uplink data 528.

While merely summing the telemetry signal 510 and the noise signal 522 prior to demodulation at block 526 is operable in some cases, in other more sophisticated embodiments the combining of the telemetry signal 510 and the noise signal 522 may use a form of adaptive filtering to ensure proper reduction of the noise components before the demodulation. For example, the weighting of the noise signal may be adjusted, as illustrated by weighting block 530. The amount of weighting applied by the weighting block 530 may be controlled by an RMS value of the resultant signal. In particular, the RMS circuit 536 calculates the RMS value of the resultant signal, and the output signal of the RMS circuit 546 is applied to the weight setting system 540. As discussed above with respect to the single sensor assembly embodiments, the weight setting system 540 adaptively adjusts the weighting provided by block 530 to reduce noise in the telemetry signal, with the noise reduction proportional to the RMS value of the telemetry signal. Other adaptive filter arrangements may be equivalently used.

The signal processing illustrated by FIGS. 2 and 5 may be performed in discrete electronics; however, in accordance with at least some embodiments the signal processing represented by FIGS. 2 and 5 is completed based on digital representations of the respective signals and software executing on a processor, for example a processor within the signal processing system 306 (FIG. 3).

Figure 6:
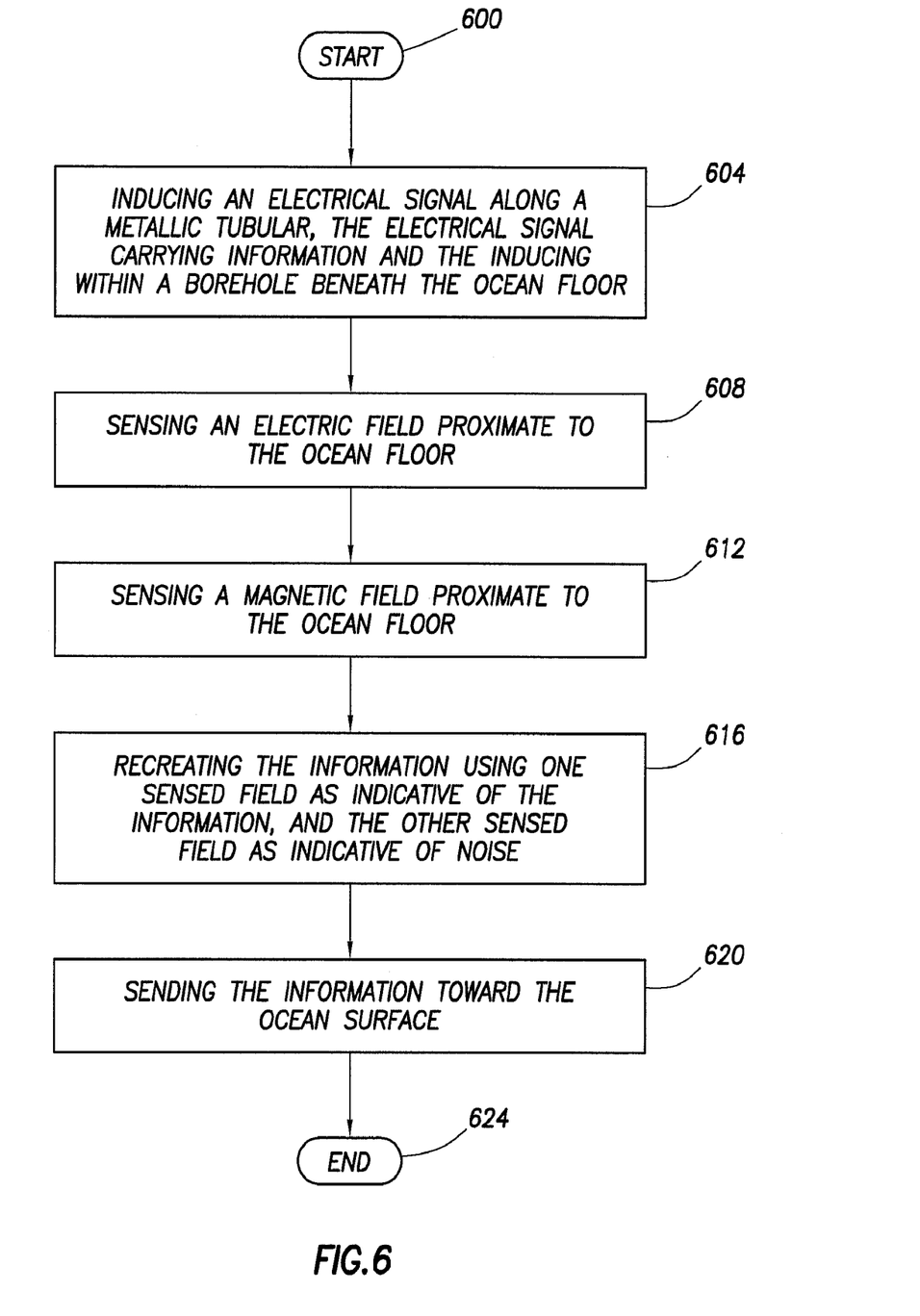
FIG. 6 shows a method in accordance with various embodiments.

FIG. 6 illustrates a method in accordance with at least some embodiments. In particular, the method starts (block 600) and moves to inducing an electrical signal along a metallic tubular, the electrical signal carrying the information and the inducing within a borehole beneath the ocean floor (block 604). Thereafter, the method involves sensing an electric field proximate to the ocean floor (block 608) and sensing a magnetic field proximate to the ocean floor (block 612). The information is then recreated using one sensed field as indicative of the information, and the other sensed field as indicative of the noise (block 616). Then, the information is sent toward the ocean surface (block 620), and the method ends (block 624).

Figure 7:
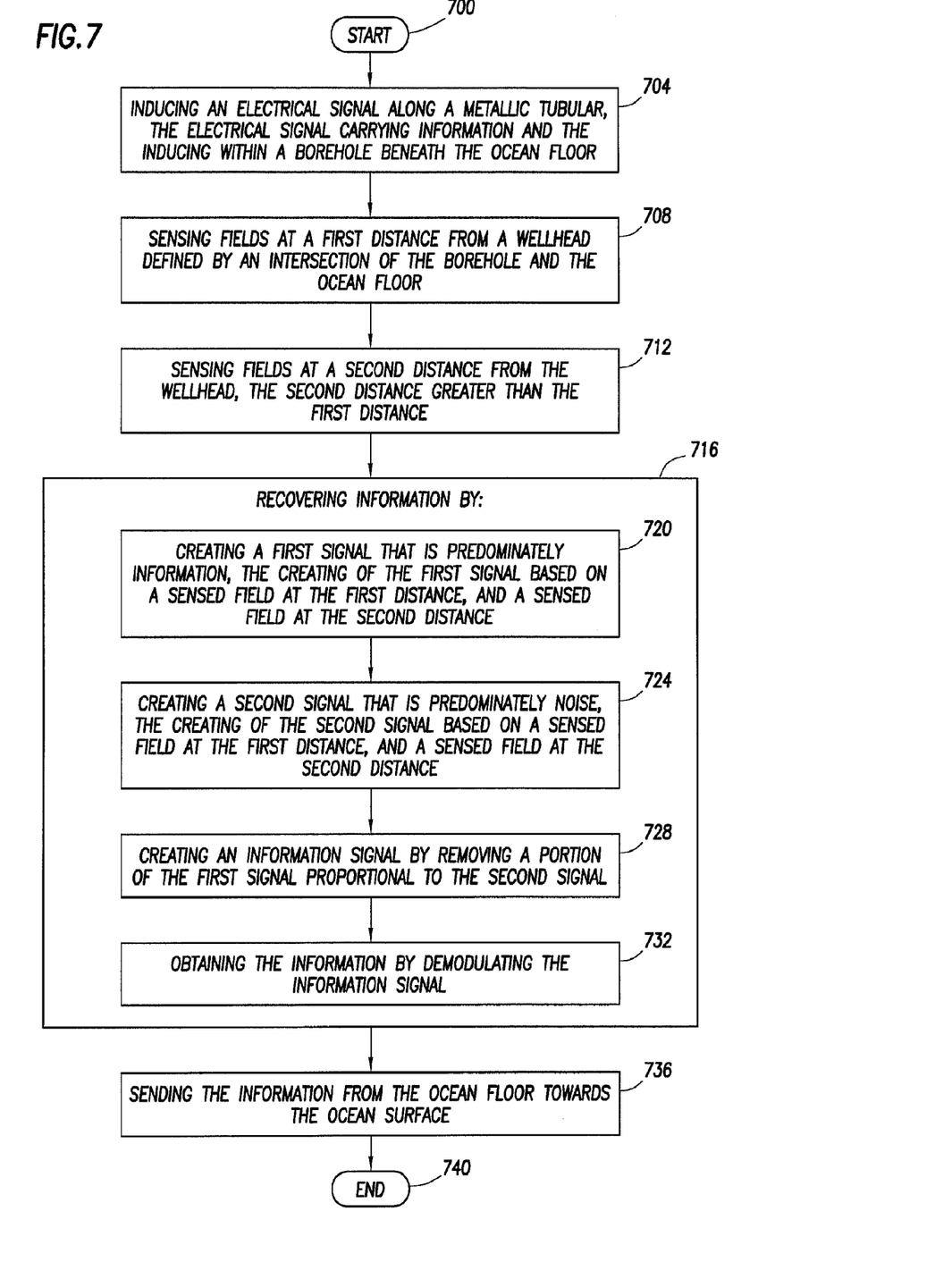
FIG. 7 shows a method in accordance with various embodiments.

FIG. 7 illustrates yet still further methods in accordance with at least some of the embodiments. In particular, the method starts (block 700) and proceeds to inducing an electrical signal along a metallic tubular, the electrical signal carrying information and the inducing within a borehole beneath the ocean floor (block 704). Thereafter, the method moves to sensing fields at a first distance from a wellhead defined by an intersection of the borehole in the ocean floor (block 708), and sensing fields at a second distance from the wellhead, the second distance greater than the first distance (block 712). Next, the information is recovered (block 716) by: creating a first signal that is predominately information (the creating of the first signal based on a sensed field at a first distance, and a sensed field at a second distance) (block 720); creating a second signal that is predominately noise (the creating of the second signal based on a sensed field at the first distance, and a sensed field at the second distance) (block 724); creating an information signal by removing a portion of the first signal proportional to the second signal (block 728); and obtaining the information by demodulating the information signal (block 732). Thereafter, the information is sent from the ocean floor toward the ocean surface (block 736), and the method ends (block 740).

The various embodiments discussed to this point have been in relation to sensing telemetry signals (comprising uplink data) sent by the transmitter 34, and repeating that uplink data toward the surface by the telemetry repeater system 50. In some cases, however, the transmitter 34 may be at a depth below the ocean floor such that electrical signals induced on the tubulars by the transmitter 34 may dissipate to the point of being undetectable on the ocean floor. In order to address these situations, in accordance with at least some embodiments, and returning to FIG. 1, the drill string 12 may comprise one or more telemetry repeaters 80 directly coupled to the drill string 12. In particular, the one or more repeaters 80 may sense the electrical signals induced by the transmitter 34, and may reproduce those signals with higher power such that the electric fields and magnetic fields associated with the signals are detectable by the telemetry repeater system 50 on the ocean floor. In some cases, the repeater 80 reproduces the signal within a different band of frequencies to reduce interference between the signals. Thus, the presence or absence of repeaters 80 directly coupled to the drill string 12 does not adversely affect and/or change the operation of the telemetry repeater system 50 in accordance with the various embodiments.

Still referring to FIG. 1, the various embodiments of the telemetry repeater system 50 have been discussed in relation to uplink data; however, the sensing of the magnetic and electric fields by the telemetry repeater system 50 is not limited to telemetry originating from downhole. If the water depth is sufficiently shallow and/or a sufficient number of repeaters are used between the ocean floor and the ocean surface, it is possible for downlink telemetry originating on the drilling rig 2 and to be sensed by the telemetry repeater system 50. In these illustrative cases, rather than reproducing the signal as an acoustic or optical signal through the ocean water, the signal processing system 306 (FIG. 3) may be associated with a transmitter proximate to the tubulars near the wellhead which may reproduce the downlink telemetry signals destined for the downhole devises.

Further still, and as mentioned above, the magnetic field sensors (magnetometers) of the sensor assemblies 60 may be either scaler magnetometers, or biaxial or triaxial magnetometers. In systems utilizing biaxial or triaxial magnetometers, further array processing may be implemented to virtually steer the reception to further reduce the noise of the received signals.

The above discussion is meant to be illustrative of the principles and various embodiments of the present invention. Numerous variations and modifications will become apparent to those skilled in the art once the above disclosure is fully appreciated. For example, the specification discusses that electric fields at greater distances are better correlated to the telemetry signal; however, the correlation is based, at least in part, on the conductor extending from the sensor toward the wellhead, giving more conductor on which to induce a voltage. Thus, the description should not be interpreted to mean that electric field correlation to telemetry is better in every case with distance. It is intended that the following claims be interpreted to embrace all such variations and modifications.

What is claimed is:

1. A method comprising:
   inducing an electrical signal along a metallic tubular, the electrical signal carrying information and the inducing being within a borehole beneath the ocean floor;
   sensing an electric field proximate to the ocean floor, the electric field associated with the electrical signal;
   sensing a magnetic field proximate to the ocean floor, the magnetic field associated with the electrical signal;
   recreating the information using one sensed field as indicative of the information, and
   the other sensed field as indicative of noise; and then
   sending the information toward the ocean surface.

2. The method of claim 1 further comprising:
   the sensing further comprises sensing the electric field and the magnetic field, both at a distance of three meters or closer to a wellhead that defines the intersection of the borehole and the ocean floor; and
   the recreating further comprises recreating using the magnetic field as indicative of the information and the electric field as indicative of the noise.

3. The method of claim 2 wherein the sensing further comprises sensing the electric field and the magnetic field, both at the wellhead.

4. The method of claim 1 further comprising:
   the sensing further comprises sensing the electric field and the magnetic field at a distance greater than three meters from a wellhead that defines an intersection of the borehole and the ocean floor; and
   the recreating further comprises recreating using the electric field as indicative of the information and the magnetic field as indicative of the noise.

5. The method of claim 4 wherein sensing further comprises sensing the electric field and magnetic field, both at a distance of between 3 and 500 meters from the wellhead.

6. The method of claim 1 wherein inducing further comprises inducing the electrical signal across an insulated gap of the metallic tubular.

7. The method of claim 1 wherein inducing further comprises inducing the electrical signal by driving an electrical current to a winding circumscribing the metallic tubular.

8. The method of claim 1 wherein sending further comprises sending the information coded in an acoustic signal propagated through the water toward the surface.

9. The method of claim 1 wherein sending further comprises sending the information coded in a visible light beam.

10. The method of claim 1 wherein sending further comprises sending the information on a cable placed proximate to a riser tubular.

11. A method comprising:
 inducing an electrical signal along a metallic tubular, the electrical signal carrying information and the inducing within a borehole beneath the ocean floor;
 sensing fields at a first distance from a wellhead defined by an intersection of the borehole and the ocean floor; sensing fields at a second distance from the wellhead, the second distance greater than the first distance;
 recovering the information by:
  creating a first signal that is predominately information, the creating of the first signal based on a sensed field at the first distance, and a sensed field at the second distance;
  creating a second signal that is predominately noise, the creating of the second signal based on a sensed field at the first distance, and a sensed field at the second distance;
  creating an information signal by removing a portion of the first signal proportional to the second signal; and
  obtaining the information by demodulating the information signal;
 sending the information from the ocean floor towards the ocean surface.

12. The method of claim 11 further comprising:
 sensing at the first distance further comprises sensing an electric field and a magnetic field at the first distance;
 sensing at the second distance further comprises sensing an electric field and a magnetic field at the second distance;
 creating the first signal further comprises creating the first signal using the magnetic field sensed at the first distance and the electric field sensed at the second distance.

13. The method of claim 11 further comprising:
 sensing at the first distance further comprises sensing an electric field and a magnetic field at the first distance;
 sensing at the second distance further comprises sensing an electric field and a magnetic field at the second distance;
 creating the second signal further comprises creating the second signal using the electric field sensed at the first distance and the magnetic field sensed at the second distance.

14. The method of claim 11 further comprising:
 sensing at the first distance further comprises sensing an electric field and a magnetic field at the first distance;
 sensing at the second distance further comprises sensing an electric field and a magnetic field at the second distance;
 creating the first signal further comprises:
  combining electric field values, an amount of contribution of each electric field to the first signal proportional to the distance at which the electric field is sensed; and
  combining magnetic fields values, an amount of contribution of each magnetic field inversely proportional to a distance at which the magnetic field is sensed;
 creating the second signal further comprises:
  combining electric field values, an amount of contribution of each electric field to the second signal inversely proportional to the distance at which the electric field is sensed; and
  combining magnetic fields values, an amount of contribution of each magnetic field to the second signal proportional to a distance at which the magnetic field is sensed.

15. A system comprising:
 a first sensor assembly proximate to the ocean floor and at first distance from a wellhead, the first sensor assembly comprising an electric field detection subsystem and a magnetic field detection subsystem;
 a second sensor assembly proximate to the ocean floor and at second distance from a wellhead, the second distance greater than the first distance, the second sensor assembly comprising an electric field detection subsystem and a magnetic field detection subsystem;
 a signal processing system communicatively coupled to each of the sensor assemblies,
  the signal processing system:
   receives electric field values and magnetic field values from each of the sensor assemblies;
   creates a primary signal that is predominantly a telemetry signal sent from a transmitter below the ocean floor within a borehole fluidly coupled to the wellhead;
   creates a secondary signal that is predominantly noise;
   reduces noise in the primary signal based on the secondary signal; and
   recovers uplink data from the primary signal; a transmitter coupled to the signal processing system, the transmitter sends the uplink data toward the surface.

16. The system of claim 15 wherein the transmitter is configured to send the uplink data along a cable toward the surface 17. The system of claim 15 wherein the transmitter is configured to send the uplink data wirelessly through the water.

18. The system of claim 17 wherein the wireless transmitter further comprises an acoustic transmitter.

19. The system of claim 17 wherein the wireless transmitter further comprises an optical transmitter.

20. The system of claim 15 wherein when the signal processing system creates the primary signal, the signal processing system creates the primary signal using magnetic field values sensed at the first distance and electric field values sensed at the second distance.

21. The system of claim 15 wherein when the signal processing system creates the secondary signal, the signal processing system creates the secondary signal using the electric field sensed at the first distance and the magnetic field sensed at the second distance.

22. The system of claim 15 further comprising:
 when the signal processing system creates the primary signal, the signal processing system:
  combines electric field values, an amount of contribution of each electric field to the primary signal proportional to the distance at which the electric field is sensed; and combines magnetic fields values, an amount of contribution of each magnetic field to the primary signal inversely proportional to a distance at which the magnetic field is sensed;

when the signal processing system creates the secondary signal, the signal processing system:
combines electric field values, an amount of contribution of each electric field to the secondary signal inversely proportional to the distance at which the electric field is sensed; and
combines magnetic fields values, an amount of contribution of each magnetic field to the secondary signal proportional to a distance at which the magnetic field is sensed.

* * * * *